US 8,874,738 B2

(12) United States Patent
Yamada

(10) Patent No.: US 8,874,738 B2
(45) Date of Patent: Oct. 28, 2014

(54) GATEWAY APPARATUS, COMMUNICATION APPARATUS, APPARATUS CO-OPERATION NETWORK SYSTEM, AND APPARATUS CO-OPERATION METHOD

(75) Inventor: Kazunori Yamada, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 199 days.

(21) Appl. No.: 13/582,799

(22) PCT Filed: Nov. 2, 2011

(86) PCT No.: PCT/JP2011/006136
§ 371 (c)(1),
(2), (4) Date: Sep. 5, 2012

(87) PCT Pub. No.: WO2012/060100
PCT Pub. Date: May 10, 2012

(65) Prior Publication Data
US 2012/0331139 A1     Dec. 27, 2012

(30) Foreign Application Priority Data
Nov. 4, 2010    (JP) ................................ 2010-247915

(51) Int. Cl.
G06F 15/173    (2006.01)
H04L 12/28     (2006.01)
(52) U.S. Cl.
CPC .................................. *H04L 12/2816* (2013.01)
USPC ............ 709/224; 709/203; 709/208; 709/223
(58) Field of Classification Search
USPC .................. 709/203, 208, 209, 217, 223, 224
See application file for complete search history.

(56) References Cited

U.S. PATENT DOCUMENTS 6,895,196 B2    5/2005   Uchizono et al.
7,873,059 B2 *  1/2011   Morita et al. ................. 370/401
(Continued)

FOREIGN PATENT DOCUMENTS

JP    2000-165419    6/2000
JP    3139481        2/2001
(Continued)

OTHER PUBLICATIONS

International Search Report issued Nov. 29, 2011 in International (PCT) Application No. PCT/JP2011/006136.

*Primary Examiner* — Ramy M Osman
(74) *Attorney, Agent, or Firm* — Wenderoth, Lind & Ponack, L.L.P.

(57) ABSTRACT

A gateway apparatus for allowing a plurality of apparatuses on a first network to co-operate with each other includes: a message monitoring unit which monitors messages communicated on the first network, and detects an apparatus discovery message for discovering an apparatus that satisfies an arbitrary requirement; an activation state managing unit which checks whether at least one target apparatus among the apparatuses that satisfies the requirement indicated by the apparatus discovery message is in an activated state for communication on the first network; a predicted activation time determining unit which determines a predicted activation time predicted as required to activate the at least one target apparatus; and a proxy response unit which transmits, in proxy of the at least one target apparatus, a response message including information indicating the predicted activation time when the at least one target apparatus is not in an activated state.

11 Claims, 17 Drawing Sheets

(56) References Cited

U.S. PATENT DOCUMENTS

| | | | |
|---|---|---|---|
| 7,917,661 B2* | 3/2011 | Bavor et al. | 709/223 |
| 8,254,254 B2* | 8/2012 | Handa | 370/230 |
| 2004/0010561 A1* | 1/2004 | Kim et al. | 709/208 |
| 2004/0146313 A1 | 7/2004 | Uchizono et al. | |
| 2006/0112171 A1* | 5/2006 | Rader | 709/218 |
| 2007/0192801 A1* | 8/2007 | Sohn | 725/39 |
| 2009/0070475 A1* | 3/2009 | Handa | 709/228 |
| 2009/0307307 A1* | 12/2009 | Igarashi | 709/203 |
| 2011/0156879 A1* | 6/2011 | Matsushita et al. | 340/10.1 |
| 2011/0296517 A1* | 12/2011 | Grigoriev et al. | 726/12 |
| 2012/0331139 A1* | 12/2012 | Yamada | 709/224 |

FOREIGN PATENT DOCUMENTS

| | | |
|---|---|---|
| JP | 2003-209939 | 7/2003 |
| JP | 2004-130525 | 4/2004 |
| JP | 2010-3245 | 1/2010 |
| WO | 2006/006507 | 1/2006 |

* cited by examiner

| Apparatus ID | State information |
|---|---|
| ID-001 | Not activated |

1104

1108

| Apparatus ID | Apparatus information | Address information | Predicted activation time |
|---|---|---|---|
| ID-001 | Server apparatus | 192.168.1.10 | 20 seconds |
| ID-002 | Client apparatus | 192.168.1.20 | |

FIG. 17B

Server apparatus list — 1203

| Apparatus name | Activation state | Predicted activation time | Power consumption | Select button |
|---|---|---|---|---|
| AAAA | Not activated | 20 seconds | 50 W | Select |
| BBBB | Not activated | 30 seconds | 25 W | Select |

| Apparatus ID | Apparatus information | Address information | Predicted activation time | Collection times |
|---|---|---|---|---|
| ID-001 | Server apparatus | 192.168.1.10 | 20 seconds | 15 times |
| ID-002 | Server apparatus | 192.168.1.20 | 30 seconds | 3 times |
| ID-003 | Client apparatus | 192.168.1.30 | | |

US 8,874,738 B2

GATEWAY APPARATUS, COMMUNICATION APPARATUS, APPARATUS CO-OPERATION NETWORK SYSTEM, AND APPARATUS CO-OPERATION METHOD

TECHNICAL FIELD

The present invention relates to a gateway apparatus, a communication apparatus, an apparatus co-operation network system, and an apparatus co-operation method for allowing a plurality of apparatuses on a network to co-operate with each other.

BACKGROUND ART

Recently, most of consumer electronics such as television sets and mobile devices such as mobile phones have a communication function such as a wireless LAN (Local Area Network) and Ethernet (registered trademark). As such, development has been actively performed on apparatus co-operation networks for allowing such apparatuses to exert their functions in a co-operated manner.

Furthermore, with increase in environmental consciousness, power-source management networks for realizing visualization of electric power consumption of each of consumer electronics and home energy management systems (HEMS) for managing activation states have been increasingly introduced in recent home network systems.

For this reason, it is assumed that future consumer electronics are connected to at least two networks that are an apparatus co-operation network connected for network AV control and a power source management network connected for power saving etc.

In addition, apparatus co-operation network systems in which high-function mobile terminals such as smart phones having a wireless LAN function are used as controllers have appeared in network AV control for television sets, recorders etc. representing DLNA (Digital Living Network Affiance). In this case, such mobile terminals are connected to apparatus co-operation networks and control the television sets and recorders in the networks. Accordingly, the users can reproduce an arbitrary content from an arbitrary apparatus by operating their mobile terminals.

In such apparatus co-operation network systems, IP-based communication techniques are mainly used. For this reason, in most cases, such an apparatus need to be in a state for interpreting at least the IP protocol. However, in terms of electric power consumption, it is undesirable that such apparatuses are always in an activated state for interpreting the IP protocol. For this reason, a problem may occur when such apparatuses are used. For example, when the power source of a television receiver is turned OFF or the television receiver is in a state of waiting at a level that does not allow interpretation of the IP protocol, the television receiver cannot at all be controlled using a mobile terminal.

In view of such a problem, a technique is disclosed in which a server apparatus monitors a message to apparatuses in a sleep state in a home network, responds to the message in proxy of the sleeping apparatuses, and activates the sleeping apparatuses (for example, see Patent Literature 1). In this way, it is possible to start control of the target apparatuses utilizing the apparatus co-operation network without requiring the users to take trouble to activate the target apparatuses that are not yet completely activated.

CITATION LIST

Patent Literature

[PTL 1]
Japanese Patent Application Publication No. 3139481

SUMMARY OF INVENTION

Technical Problem

However, the conventional scheme has been conceived without considering a case where it takes a long time that is 10 seconds or more to actually activate a target apparatus. Thus, in apparatus co-operation for consumer electronics, a too-long activation time may make a user of the apparatus co-operation network system feel anxious.

Especially in apparatus co-operation network systems, a user may control an apparatus located at a place outside a visible area, via an apparatus that is operated by the user. If the activation time of the target apparatus is too long in such a case, the user may feel very anxious because he or she cannot understand a current state and perform an erroneous operation. Such an erroneous operation may result in a failure of the apparatus co-operation.

In addition, if the activation time of the target apparatus is too long in such a case, a message may be transmitted to the target apparatus before the activation, resulting in a failure of the apparatus co-operation.

The present invention has been conceived to solve the aforementioned problems, with an aim to provide a gateway apparatus, a communication apparatus, an apparatus co-operation network system, and an apparatus co-operation method for allowing a plurality of apparatuses to stably co-operate with each other even when at least one of the apparatuses on the network is not in an activated state.

Solution to Problem

In order to achieve the aim, a gateway apparatus according to an aspect of the present invention is a gateway apparatus which is for allowing a plurality of apparatuses on a first network to co-operate with each other, and which includes: a message monitoring unit configured to monitor messages communicated on the first network, and detect an apparatus discovery message for discovering an apparatus that satisfies an arbitrary requirement; an activation state managing unit configured to check whether at least one target apparatus included in the apparatuses and satisfying the requirement indicated by the apparatus discovery message is in an activated state for communication on the first network; a predicted activation time determining unit configured to determine a predicted activation time that is a time predicted as required to activate the at least one target apparatus; and a proxy response unit configured to transmit, in proxy of the at least one target apparatus, a response message including information indicating the predicted activation time, when the at least one target apparatus is not in an activated state.

With this structure, it is possible to transmit, in proxy of the target apparatus, the response message including the information indicating the predicted activation time, when the target apparatus is not in an activated state. Accordingly, the apparatus which receives the response message can execute various kinds of processes based on the predicted activation time for the target apparatus included in the response message, and to thereby stably co-operate with the target apparatus.

In addition, the gateway apparatus preferably further includes an activation time collecting unit configured to collect an activation time of the at least one target apparatus, based on a time at which activation of the at least one target apparatus is started and a reception time of a network join message indicating that the at least one target apparatus is already in the activated state for communication on the first network, wherein the predicted activation time determining unit is preferably configured to determine the predicted activation time, based on a previously collected activation time of the at least one target apparatus.

With this structure, it is possible to determine the predicted activation time based on the previously collected activation time of the target apparatus, and to thereby increase the accuracy of the predicted activation time.

In addition, the predicted activation time determining unit is preferably further configured to calculate a prediction accuracy of the predicted activation time, based on the number of times of collecting an activation time of the at least one target apparatus, and the response message preferably further includes information indicating the prediction accuracy.

With this structure, since the response message includes the information indicating the prediction accuracy, the apparatus which receives the response message can execute various kinds of processes based on the prediction accuracy, and can stably co-operate with the target apparatus.

In addition, the gateway apparatus preferably further includes a remote-activation control unit configured to remotely activate the at least one target apparatus via a second network, when the response message is transmitted, wherein the activation time collecting unit is preferably configured to collect the activation time of the at least one target apparatus, regarding a time at which remote activation of the at least one target apparatus is started as the time at which the activation of the at least one target apparatus is started.

With this structure, it is possible to perform the remote activation of the target apparatus, and to use the time at which the remote activation of the target apparatus is started as the time at which the target apparatus starts to be activated. Accordingly, it is possible to collect a more accurate activate time.

In addition, the network join message preferably includes information indicating whether the at least one target apparatus is already remotely activated by the gateway apparatus or not, and the activation time collecting unit is preferably configured to collect the activation time of the at least one target apparatus only when the network join message indicates that the at least one target apparatus is already remotely activated by the gateway apparatus.

With this structure, it is possible to collect the activation time only when the network join message indicates the successful remote activation. In other words, it is possible to suppress collection of an activation time, based on the network join message that is transmitted in the case of activation by an activation process other than remote activation. As a result, it is possible to collect an accurate activation time in the case of the remote activation by the gateway apparatus.

In addition, the remote-activation control unit is preferably configured to remotely activate the at least one target apparatus when the at least one target apparatus is one in number, and avoid remotely activating the at least one target apparatus when the at least one target apparatus is two or more in number.

With this structure, it is possible to suppress increase in electric power consumption when the at least one target apparatus is two or more in number because there is no need to perform remote activation on all the target apparatuses that are not in an activated state.

In addition, the gateway apparatus preferably further includes an activation time collecting unit configured to collect an activation time of the at least one target apparatus, based on a power consumption value of the at least one target apparatus, wherein the predicted activation time determining unit is preferably configured to determine the predicted activation time, based on a previously collected activation time of the at least one target apparatus.

With this structure, it is possible to easily collect an activation time of the target apparatus, based on the power consumption value of the target apparatus.

A communication apparatus according to an aspect of the present invention is a communication apparatus which co-operates with apparatuses on a first network. The communication apparatus includes an apparatus co-operation processing unit configured to transmit, to the apparatuses on the first network, an apparatus discovery message for discovering an apparatus that satisfies an arbitrary requirement, and receive a response message to the apparatus discovery message, and executes at least one predetermined process, based on the predicted activation time when the response message includes the predicted activation time that is a time predicted as required to activate the at least one target apparatus that satisfies the requirement indicated by the apparatus discovery message.

With this structure, when the response message to the apparatus discovery message includes the predicted activation time, it is possible to execute at least one predetermined process based on the predicted activated time.

In addition, the communication apparatus preferably includes a notifying unit configured to execute, as the predetermined process, a process of notifying a user of the predicted activation time when the response message includes the predicted activation time.

With this structure, when the response message includes the predicted activation time, it is possible to notify the user of the predicted activation time and to suppress erroneous user operation.

In addition, the apparatus co-operation processing unit is preferably configured, when the response message includes the predicted activation time, to execute, as the predetermined process, a process of transmitting, to the at least one target apparatus indicated by the response message, a message for co-operation between the communication apparatus and the target apparatus, after the predicted activation time elapses from a reception time of the response message.

With this structure, it is possible to transmit the message to the target apparatus after the elapse of the predicted activation time included in the response message, and thus enable stable co-operation with the target apparatus.

In addition, the apparatus co-operation processing unit is preferably configured, when the response message includes the predicted activation time, to execute, as the predetermined process, a process of transmitting, to the at least one target apparatus indicated by the response message, a message for co-operation between the communication apparatus and the target apparatus, after the predicted activation time elapses from a reception time of the response message.

With this structure, when the at least one target apparatus is two or more in number, it is possible to transmit the apparatus discovery message for discovering one target apparatus selected from among the target apparatuses. As a result, the gateway apparatus does not need to activate all the target apparatuses. Therefore, it is possible to suppress increase in the power consumption amount.

In addition, the gateway apparatus may be configured as an integrated circuit.

In addition, the present invention can be realized as an apparatus co-operation network system including the gateway apparatus and the communication apparatus as described above. In addition, the present invention can be realized as an apparatus co-operation method including the steps corresponding to the operations performed by the unique structural units of the gateway apparatus. In addition, the present invention can be realized as a program for causing a computer to execute these steps of the apparatus co-operation method. Such a program can naturally be distributed via recording media such as CD-ROMs or transmission media such as the Internet.

Advantageous Effects of Invention

As described above, according to the present invention, it is possible to remotely activate a target apparatus in a network when the target apparatus is not in an activation state, and transmit a response message including a predicted activation time required for the target apparatus, in proxy of the target apparatus. Accordingly, the apparatus which receives the response message can execute various kinds of processes based on the predicted activation time for the target apparatus, and to thereby stably co-operate with the target apparatus.

BRIEF DESCRIPTION OF DRAWINGS

FIG. 17B is a diagram of an example of information displayed by the client apparatus according to Embodiment 2 of the present invention.

FIG. 18 is a diagram of an example of an apparatus information list according to an aspect of the present invention.

DESCRIPTION OF EMBODIMENTS

Hereinafter, embodiments of the present invention are described with reference to the drawings. Each of the following embodiments described below shows a preferred specific example of the present invention. In other words, the numerical values, structural elements, the arrangement and connection of the structural elements, steps, the processing order of the steps etc. shown in the following exemplary embodiments are mere examples, and therefore do not limit the present invention. The present invention is defined based on the descriptions in the Claims. Accordingly, among the structural elements in the following exemplary embodiments, structural elements not recited in any one of the independent claims defining the most generic part of the present invention are not always necessary for achieving the aim of the present invention although these structural elements are described as structural elements of preferred embodiments.

[Embodiment 1]

Figure 1:
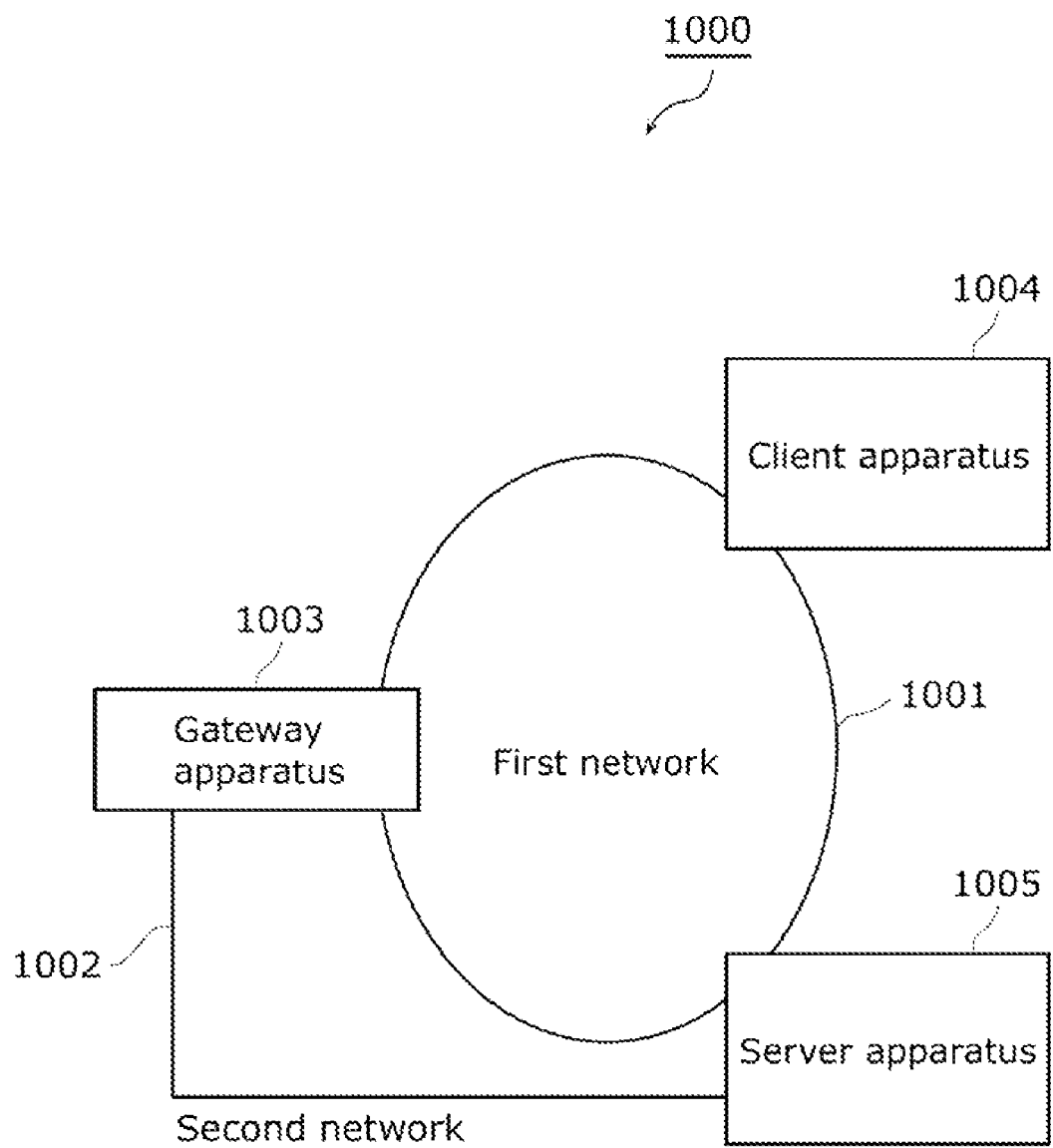
FIG. 1 schematically shows an apparatus co-operation network system according to Embodiment 1 of the present invention.

FIG. 1 schematically shows an apparatus co-operation network system 1000 according to Embodiment 1 of the present invention. As shown in FIG. 1, the apparatus co-operation network system 1000 includes a gateway apparatus 1003, a client apparatus 1004, and a server apparatus 1005.

The gateway apparatus 1003, the client apparatus 1004, and the server apparatus 1005 are connected to a first network 1001 wirelessly. The first network 1001 is, for example, a LAN (Local Area Network) that is a communication network using the IP (Internet Protocol).

The gateway apparatus 1003, the client apparatus 1004, and the server apparatus 1005 may be connected to the first network 1001 in a manner other than wirelessly.

The server apparatus 1005 and the gateway apparatus 1003 are connected to a second network 1002. The gateway apparatus 1003 can remotely activates the server apparatus 1005 via the second network 1002.

Preferably, the second network 1002 is a particular power-saving wireless network such as ZigBee. In this way, the server apparatus 1005 can reduce electric power that must be supplied even in a non-activated state in order for communication via the second network 1002. In other words, the server apparatus 1005 can reduce electric power for standby.

The second network 1002 may be, for example, a unique exclusive network. In addition, the second network 1002 may be formed, for example, as a signal line for activation control by a power source switch. In other words, the second network 1002 may be identical to the first network 1001 as long as the second network 1002 can exert the minimum function of changing the state of a target apparatus connected in the network from an activated state and a non-activated state.

Here, when the target apparatus is in an activated state, the target apparatus can make communication in the first network 1001. On the other hand, when the target apparatus is in a non-activated state, the target apparatus cannot make communication in the first network 1001.

Next, each of apparatuses included in the apparatus cooperation network system 1000 is described in detail.

Figure 2:
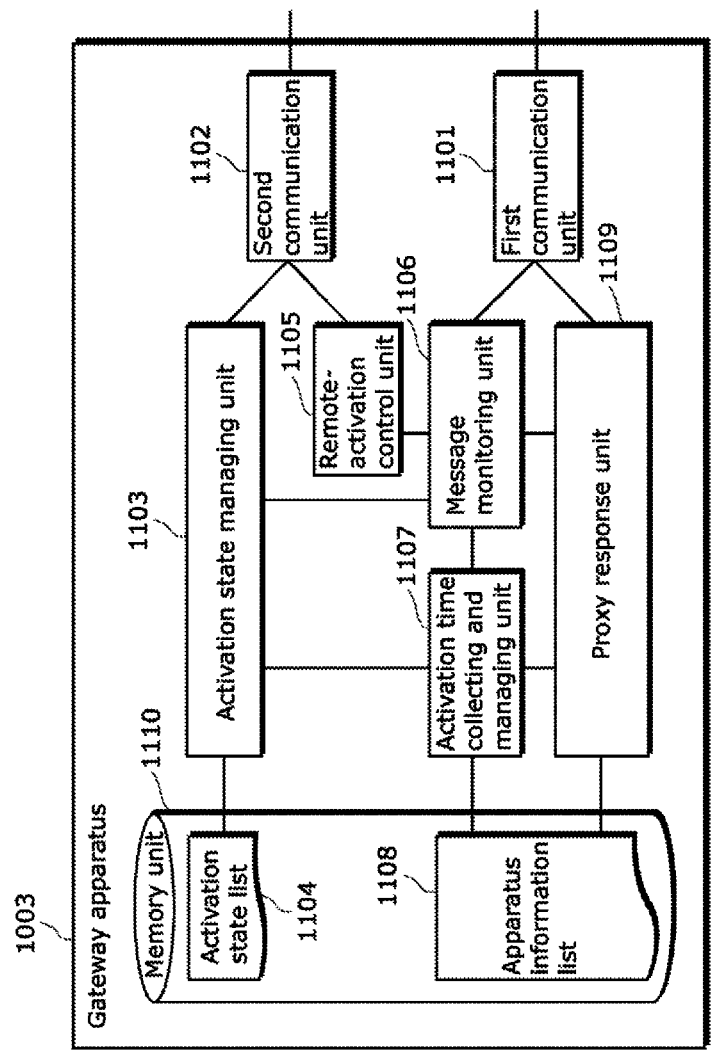
FIG. 2 is a block diagram of a functional structure of a gateway apparatus according to Embodiment 1 of the present invention.

FIG. 2 is a block diagram of a functional structure of a gateway apparatus 1003 according to Embodiment 1 of the present invention. This gateway apparatus 1003 corresponds to a gateway device. More specifically, as shown in FIG. 2, the gateway apparatus 1003 includes: a first communication unit 1101, a second communication unit 1102, an activation state managing unit 1103, a remote-activation control unit 1105, a message monitoring unit 1106, an activation time collecting and managing unit 1107, a proxy response unit 1109, and a memory unit 1110.

The first communication unit 1101 is a communication interface for communication with one of the apparatuses (the apparatus here is the client apparatus 1004 or the server apparatus 1005) in the first network 1001. The second communication unit 1102 is a communication network for communication with one of the apparatuses (the apparatus here is the server apparatus 1005) in the second network 1002.

The activation state managing unit 1103 checks whether or not the apparatus in the second network 1002 is in an activated state, using the second communication unit 1102.

Furthermore, the activation state managing unit 1103 stores the result of the check in the activation state list 1104 in association with apparatus ID for identifying the apparatus. The details of the activation state list 1104 is described later with reference to FIG. 3.

The remote-activation control unit 1105 controls the activation state of the apparatus by giving the apparatus in the second network 1002 an instruction for activation or termination. In other words, the remote-activation control unit 1105 changes the state of the apparatus from a non-activated state to an activated state by remotely activating the apparatus via the second network 1002. Furthermore, the remote-activation control unit 1105 notifies the activation time collecting and managing unit 1107 of a time at which the remote activation of the apparatus is started.

The message monitoring unit 1106 detects an apparatus discovery message by monitoring messages communicated in the first network 1001. In addition, upon discovering the apparatus discovery message, the message monitoring unit 1106 requests the activation state managing unit 1103 to check whether or not the target apparatus is in an activated state.

Here, the apparatus discovery message is a message for discovering the apparatus that satisfies an arbitrary requirement from among the apparatuses on the first network 1001. More specifically, the apparatus discovery message is a message for requesting the target apparatus that satisfies the requirement indicated by the apparatus discovery message to transmit a response message.

The target apparatus is an apparatus to which the apparatus discovery message is transmitted. More specifically, the target apparatus is an apparatus that satisfies the requirement indicated by the apparatus discovery message from among the apparatuses on the first network.

Here, the message monitoring unit 1106 does noting when the target apparatus is in an activated state, but requests the proxy response unit 1109 to transmit a proxy response when the target apparatus is not in an activated state. In addition, when the message monitoring unit 1106 receives a network join message such as Notify, the message monitoring unit 1106 notifies the activation time collecting and managing unit 1107 of the reception.

The network join message is a message indicting that the message-source apparatus is now in a state for communication in the first network 1001. In other words, the network join message is a message indicating that the message-source apparatus is now in an activated state.

The activation time collecting and managing unit 1107 corresponds to an activation time collecting unit, and collects an activation time of the target apparatus based on a time (remote activation starting time) at which remote activation of the target apparatus is started and a time (network join message reception time) at which the network join message is received. Here, the remote-activation starting time is obtained from the remote-activation control unit 1105, and the network join message reception time is obtained from the message monitoring unit 1106. In other words, the activation time collecting and managing unit 1107 collects, as an activation time, a time duration from the remote activation starting time to the network join message reception time.

Here, an activation time of an apparatus is a time required to change the state of the apparatus from a non-activated state to an activated state. In other words, the activation state is a time duration from when the state of the target apparatus is changed from a state in which no communication in the first network 1001 can be made to a state in which communication in the first network 1001 can be made.

In addition, the activation time collecting and managing unit 1107 corresponds to a predicted activation time determining unit, and determines a predicted activation time that is a time predicted as required for the target apparatus to be in an activated state. In this embodiment, the activation time collecting and managing unit 1107 determines a predicted activation time that is a time predicted as required for the target apparatus to be in an activated state when the target apparatus is activated remotely in future, based on a previously collected activation time. More specifically, the activation time collecting and managing unit 1107 determines, for example, the activation time collected last as the predicted activation time.

In addition, for example, the activation time collecting and managing unit 1107 may predict, as the predicted activation time, an average value of previously collected activation times. In addition, for example, the activation time collecting and managing unit 1107 may exclude some previously collected activation times widely different from the remaining previously collected activation times, and predict, as the predicted activation time, an average value of the remaining previously collected activation times.

The average value may be statically averaged, and does not always need be an arithmetic average value. Alternatively, the activation time collecting and managing unit 1107 may predict, as the predicted activation time, a median value or a mode value instead of the average value. In other words, the activation time collecting and managing unit 1107 may determine, as the predicted activation time, a statistically representative value of the previously collected activation times.

The activation time collecting and managing unit 1107 does not always need to determine the predicted activation time based on the previously collected activation times. For example, the activation time collecting and managing unit 1107 may determine a time preset by a user as the predicted activation time.

The activation time collecting and managing unit 1107 includes the determined predicted activation time of the target apparatus in an apparatus information list 1108.

Based on the request from the message monitoring unit 1106, the proxy response unit 1109 makes a response message to be transmitted in proxy of the target apparatus, by referring to address information and the predicted activation time of the target apparatus stored in the apparatus information list 1108. More specifically, the proxy response unit 1109 makes a response message including information indicating the predicted activation time determined by the activation time collecting and managing unit 1107. The proxy response unit 1109 transmits the made response message to the apparatus that is the transmission source of the apparatus discovery message.

Here, information indicating the predicted activation time does not always need to be the information indicating the raw predicted activation time. For example, the information indicating the predicted activation time may be information indicating the length of the predicted activation time. More specifically, the information indicating the predicted activation time may be a classification symbol (for example, "Long", "Medium", or "Short") according to the length of the predicted activation time.

The memory unit 1110 is, for example, a hard disk or a flash memory, and stores the activation state list 1104 and the apparatus information list 1108. Hereinafter, the activation state list 1104 and the apparatus information list 1108 are described with reference to FIG. 3 and FIG. 4.

Figures 3, 4, 5:
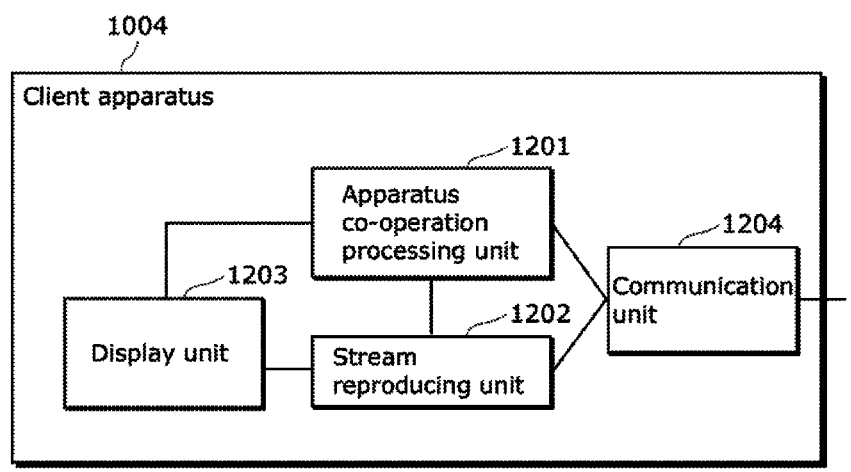
FIG. 3 is a diagram of an example of an activation state list according to Embodiment 1 of the present invention.
FIG. 4 is a diagram of an example of an apparatus information list according to Embodiment 1 of the present invention.
FIG. 5 is a block diagram of a functional structure of a client apparatus according to Embodiment 1 of the present invention.

FIG. 3 is a diagram of an example of an activation state list 1104 according to Embodiment 1 of the present invention. As shown in FIG. 3, the activation state list 1104 stores the apparatus ID and state information in association with each other.

The apparatus ID is unique ID managed between the apparatuses on the first network 1001. In other words, the apparatus ID is identifier for identifying each apparatus in the first network 1001. For example, the apparatus ID is set by the user. Otherwise, the apparatus ID may be set in the apparatus in advance.

The state information shows whether or not the apparatus identified by the apparatus ID is in an activated state. FIG. 3 shows that the apparatus identified by the apparatus ID "ID-001" is "in a non-activated state".

FIG. 4 is a diagram of an example of the apparatus information list 1108 according to Embodiment 1 of the present invention. As shown in FIG. 4, the apparatus information list 1108 stores the apparatus information, address information, and predicted activation time, in association with the apparatus ID.

The apparatus information mainly shows information related to services that can be provided by the target apparatus. The apparatus information list 1108 shown in FIG. 4 manages, for example, the apparatus identified by "ID-001" as a server apparatus which is capable of streaming images or sounds.

The address information is information for communicating between the apparatuses on the first network 1001. FIG. 4 stores, for example, an IP address (192.168.1.10") as address information of the apparatus identified by "ID-001".

The predicted activation time is an activation time predicted by the activation time collecting and managing unit 1107. In FIG. 4, "20 seconds" is stored as a predicted activation time for the apparatus identified by "ID-001".

Next, the functional structure of the client apparatus 1004 is described with reference to FIG. 5.

FIG. 5 is a block diagram of the functional structure of the client apparatus 1004 according to Embodiment 1 of the present invention. The client apparatus 1004 corresponds to a communication apparatus. As shown in FIG. 5, the client apparatus 1004 includes: an apparatus co-operation processing unit 1201, a stream reproducing unit 1202, a display unit 1203, and a communication unit 1204.

The apparatus co-operation processing unit 1201 transmits an apparatus discovery message for discovering an apparatus that satisfies an arbitrary requirement, to each of apparatuses on the first network 1001. In this embodiment, in order to discover the server apparatus 1005 in the first network 1001, the apparatus co-operation processing unit 1201 multicasts, using the communication unit 1204, an apparatus discovery message that requests each apparatus to transmit a response message if the apparatus is the server apparatus 1005.

The apparatus co-operation processing unit 1201 receives a response message in response to the transmitted apparatus discovery message. Upon receiving the response message in response to the apparatus discovery message, the apparatus co-operation processing unit 1201 notifies the stream reproducing unit 1202 of the fact.

In addition, the apparatus co-operation processing unit 1201 determines whether or not the response message includes information indicating the predicted activation time that is the time predicted as being required to activate the target apparatus that satisfies the requirement indicated by the apparatus discovery message. Here, when the response message includes the information indicating the predicted activation time, the apparatus co-operation processing unit 1201 notifies the display unit 1203 of the information indicating the predicted activation time.

According to the notification from the apparatus co-operation processing unit 1201, the stream reproducing unit 1202 transmits, using the communication unit 1204, a stream transmission request message to the target apparatus (here, the server apparatus 1005) indicated by the response message to the apparatus discovery message. When the response message includes the information indicating the predicted activation time, the stream reproducing unit 1202 transmits the stream transmission request message after the predicted activation time elapses from the reception time of the response message.

Next, the stream reproducing unit 1202 reproduces a stream that is transmitted from the server apparatus 1005 via the first network 1001.

Here, the target apparatus indicated by the response message is one of the apparatus which is the transmission source of the response message and the apparatus for which transmission of the response message is performed by proxy. In this embodiment, the target apparatus indicated by the response message is the server apparatus 1005.

The display unit 1203 is an example of a notifying unit, and is, for example, a liquid crystal display or a plasma display. The display unit 1203 displays video data that is reproduced by the stream reproducing unit 1202. In addition, the display unit 1203 displays a predicted activation time notified from the apparatus co-operation processing unit 1201. In other words, the display unit 1203 notifies the user of the information indicating the predicted activation time when the received response message includes the information indicating the predicted activation time.

The communication unit 1204 is a communication interface for communication with one of the apparatuses (the apparatus here is the gateway apparatus 1003 or the server apparatus 1005) connected to the first network 1001.

Next, the functional structure of the server apparatus 1005 is described with reference to FIG. 6.

Figure 6:
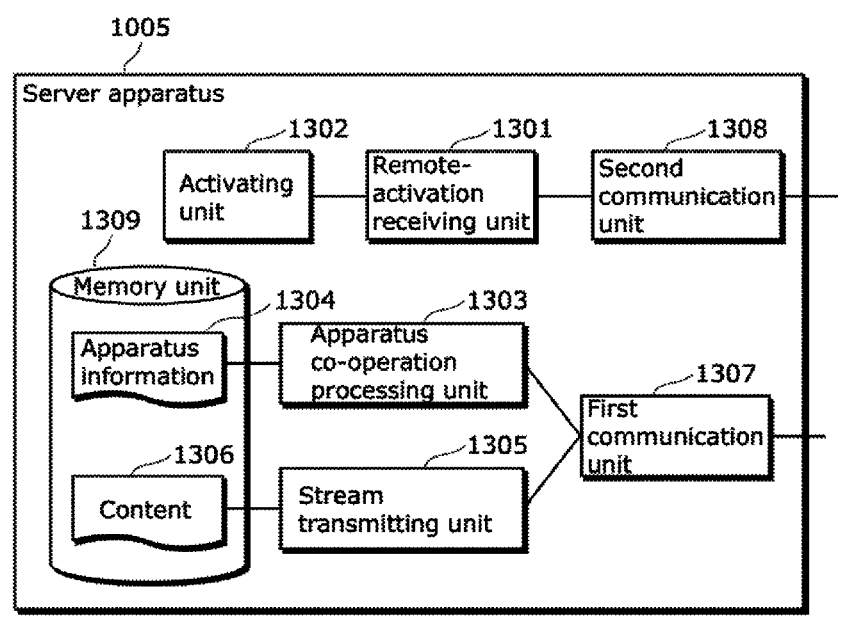
FIG. 6 is a block diagram of a functional structure of a server apparatus according to Embodiment 1 of the present invention.

FIG. 6 is a block diagram of a functional structure of the server apparatus 1005 according to Embodiment 1 of the present invention. As shown in FIG. 6, the server apparatus 1005 includes: a remote-activation receiving unit 1301, an activating unit 1302, an apparatus co-operation processing unit 1303, a stream transmitting unit 1305, a first communication unit 1307, a second communication unit 1308, and a storage unit 1309.

The remote-activation receiving unit 1301 receives, using the second communication unit 1102, a remote activation request from the gateway apparatus 1003 via the second network 1002. Next, the remote-activation receiving unit 1301 notifies the activating unit 1302 of the received remote activation request.

The activating unit 1302 activates the server apparatus 1005 according to the notification from the remote-activation receiving unit 1301. In other words, the activating unit 1302 changes the state of the server apparatus 1005 from a non-activated state to an activated state.

When the server apparatus is in the activated state, the apparatus co-operation processing unit 1303 receives an apparatus discovery message from the client apparatus 1004 via the first network 1001. Next, the apparatus co-operation processing unit 1303 checks whether or not the apparatus (the server apparatus 1005) is the target apparatus that satisfies the requirement indicated by the apparatus discovery message, with reference to apparatus information 1304. When the apparatus is the target apparatus, the apparatus co-operation processing unit 1303 transmits a response message to the transmission source of the apparatus discovery message.

The apparatus information 1304 includes information about the apparatus. More specifically, the apparatus information 1304 includes information indicating whether or not the apparatus functions as a server.

The apparatus co-operation processing unit 1303 broadcasts, using the first communication unit 1307, a network join message to apparatuses on the first network 1001 when the server apparatus 1005 is changed from the non-activated state to the activated state.

According to the stream transmission request message received from the client apparatus 1004, the stream transmitting unit 1305 reads out a content 1306 from the storage unit 1309 and transmits the content 1306 in the form of a stream to the client apparatus 1004.

The first communication unit 1307 is a communication interface for communicating with one of the apparatuses (the apparatus here is the gateway apparatus 1003 or the client apparatus 1004) connected in the first network 1001. In addition, the second communication unit 1102 is a communication interface for communication with one of the apparatuses (the apparatus here is the gateway apparatus 1003) connected in the second network 1002.

The storage unit 1309 is, for example, a hard disk or a flash memory. The storage unit 1309 stores the apparatus information 1304 and the content 1306.

Next, descriptions are given of various kinds of operations performed in the apparatus co-operation network system 1000 configured as described above.

Figure 7:
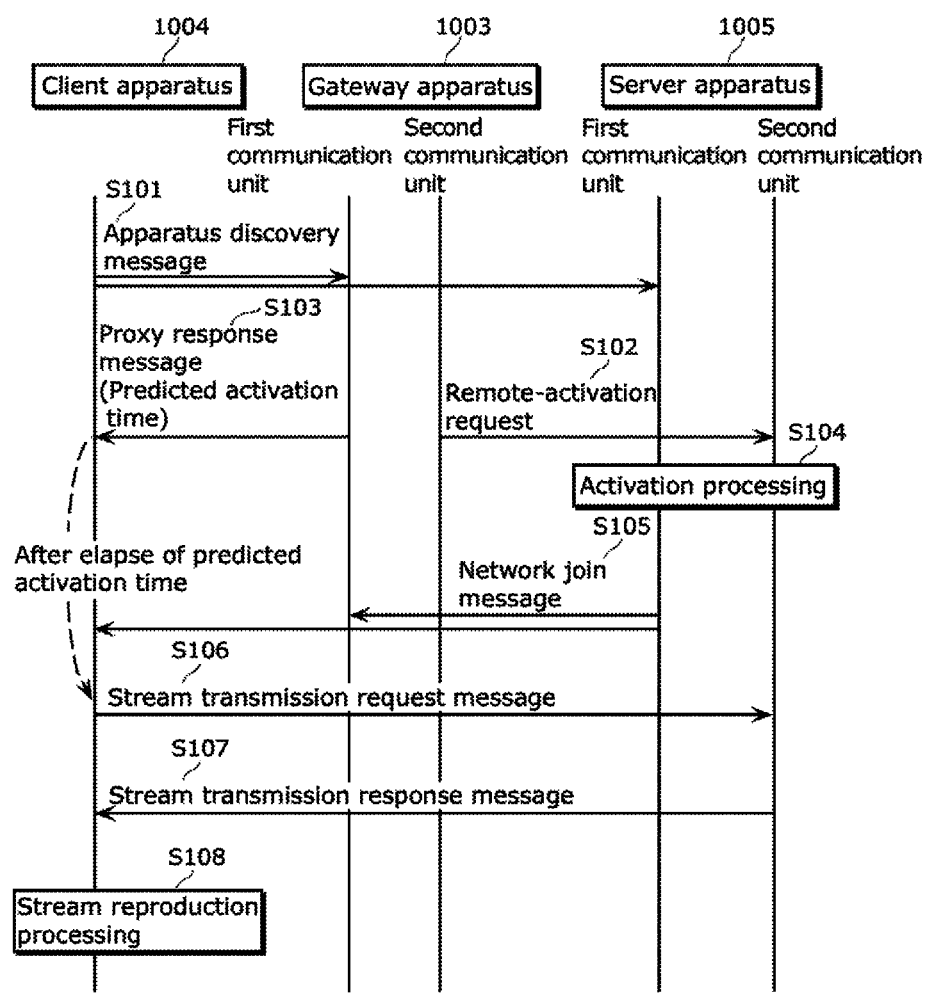
FIG. 7 is a sequence diagram showing an information flow in the apparatus co-operation network system according to Embodiment 1 of the present invention.

FIG. 7 is a sequence diagram showing an information flow in the apparatus co-operation network system 1000 according to Embodiment 1 of the present invention. FIG. 7 illustrates a case where the server apparatus 1005 is in a non-activated state as an initial state.

First, the apparatus co-operation processing unit 1201 of the client apparatus 1004 broadcasts the apparatus discovery message to the apparatuses (the gateway apparatus 1003 and the server apparatus 1005) in the first network 1001 (Step S101). The server apparatus 1005 is in the non-activated state, and thus cannot receive the apparatus discovery message.

Next, the activation state managing unit 1103 of the gateway apparatus 1003 checks whether or not the target apparatus that satisfies the requirement indicated by the apparatus discovery message is in an activated state or not. Here, the activation state managing unit 1103 extracts the apparatus ID ("ID-001") of the apparatus whose apparatus information in the apparatus information list 1108 shown in FIG. 4 indicates that the apparatus functions as a server apparatus. Next, the activation state managing unit 1103 checks whether or not the apparatus having the extracted apparatus ID is in an activated state, with reference to the activation state list 1104 shown in FIG. 3. In this embodiment, the apparatus identified by "ID-001" is assumed to be the server apparatus 1005.

Since the server apparatus 1005 is not in an activated state, the remote-activation control unit 1105 transmits, to the server apparatus 1005, a remote activation request for remotely activating the server apparatus 1005 (Step S102).

In addition, the proxy response unit 1109 of the gateway apparatus 1003 transmits a proxy response message including the information indicating the predicted activation time in proxy of the server apparatus 1005 to the client apparatus that is the transmission source of the apparatus discovery message (Step S103). More specifically, for example, the proxy response unit 1109 obtains a predicted activation time ("20 seconds") required for the server apparatus 1005, with reference to the apparatus information list 1108 shown in FIG. 4. Next, the proxy response unit 1109 transmits, to the client apparatus 1004, the proxy response message including the information indicating the predicted activation time obtained in this way.

Next, the activating unit 1302 of the server apparatus 1005 activates the server apparatus 1005 according to the remote activation request (Step S104). Next, when the server apparatus 1005 is changed into an activated state, the apparatus co-operation processing unit 1303 multicasts the network join message to the apparatus in the first network 1001 (Step S105).

The activation time collecting and managing unit 1107 of the gateway apparatus 1003 collects, as an activation time required for the server apparatus 1005, a time duration from a remote activation request transmission time to a network join message reception time. Furthermore, using the activation time collected in this way, the activation time collecting and managing unit 1107 determines, as a predicted activation time, the time predicted as being required for future remote activation of the server apparatus 1005, and adds the predicted activation time in the apparatus information list 1108.

The apparatus co-operation processing unit 1201 of the client apparatus 1004 transmits a stream transmission request message to the server apparatus 1005 after the predicted activation time elapses from the time point at which the proxy response message is received (Step S106).

The stream transmitting unit 1305 of the server apparatus 1005 receives the stream transmission request message from the client apparatus 1004, and transmits the stream transmission response message to the client apparatus 1004 (Step S107). Next, the stream reproducing unit 1202 of the client apparatus 1004 executes a process (hereinafter referred to as a "stream reproducing process) required to reproduce the stream transmitted from the server apparatus 1005 (Step S108).

Next, a flow of processes performed by the gateway apparatus 1003 is explained with reference to FIG. 8.

Figure 8:
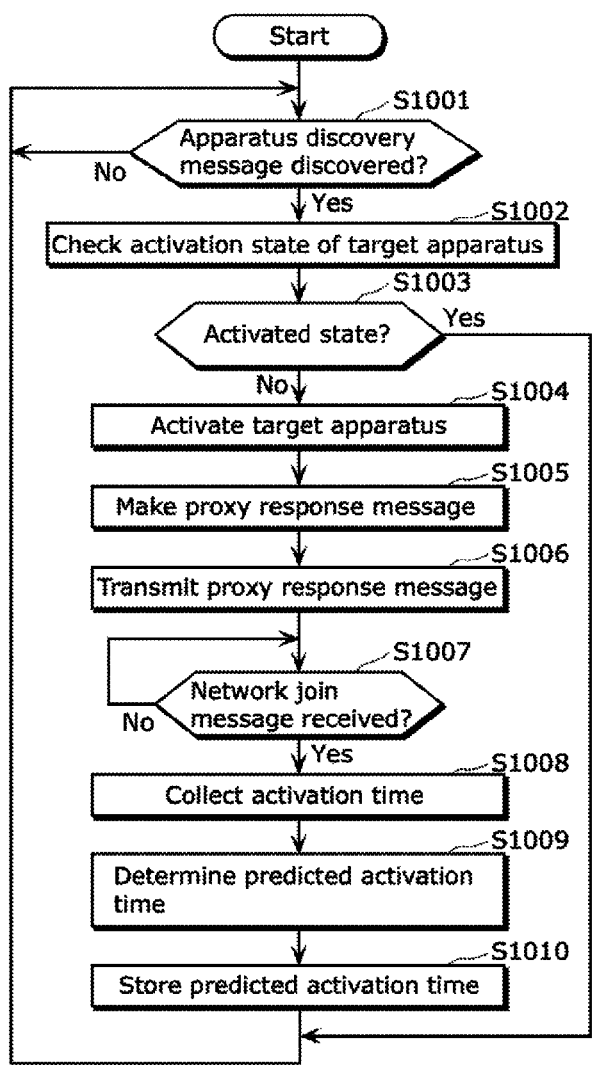
FIG. 8 is a flowchart of processes performed by the gateway apparatus according to Embodiment 1 of the present invention.

FIG. 8 is a flowchart of the processes performed by the gateway apparatus 1003 according to Embodiment 1 of the present invention. More specifically, FIG. 8 is a flowchart of the processes starting with the process in which the gateway apparatus 1003 detects the apparatus discovery message and ending with the process in which the gateway apparatus 1003 adds the predicted activation time to the apparatus information list 1108.

Before starting the processes shown in FIG. 8, the activation state managing unit 1103 checks, using the second communication unit 1102, whether or not each of the apparatuses on the second network 1002 is an activated state, and adds the result of the check to the activation state list 1104.

As such a method for checking whether or not an apparatus is in an activated state, for example, information indicating whether or not each of the apparatus in the second network 1002 is in an activated state or not may be notified to the activation state managing unit 1103 of the gateway apparatus 1003. Alternatively, the activation state managing unit 1103 of the gateway apparatus 1003 may ask each apparatus in the second network 1002 periodically or at an arbitrary timing.

The message monitoring unit 1106 monitors messages communicated on the first network 1001, and detects that one of the messages is received by the first communication unit 1101. The message monitoring unit 1106 determines whether or not the received message is an apparatus discovery message (Step S1001). When determining that the received message is not an apparatus discovery message (No in Step S1001), the message monitoring unit 1106 returns back to a message monitoring state.

When determining that the received message is an apparatus discovery message (Yes in Step S1001), the message monitoring unit 1106 extracts, as the target apparatus, the apparatus that satisfies the requirement indicated by the apparatus discovery message, with reference to the apparatus information list 1108. Next, activation state managing unit 1103 checks whether or not the target apparatus is in an activated state, with reference to the apparatus state list 1104 (Step S1002).

Here, when the target apparatus is in an activated state (Yes in Step S1003), the message monitoring unit 1106 returns back to a message monitoring state. When the target apparatus is not in an activated state (No in Step S1003), the remote-activation control unit 1105 remotely activates the target apparatus (Step S1004). At this time, the activation time collecting and managing unit 11007 holds the remote activation starting time.

In addition, the proxy response unit 1109 makes a proxy response message, with reference to the apparatus information list 1108 (Step S1005). Next, the proxy response unit 1109 transmits, using the first communication unit 1101, the made proxy response message to the apparatus that is the transmission source of the apparatus discovery message (Step S1006).

At this time, the message monitoring unit 1106 monitors the messages communicated in the first network 1001 (Step S1007). When the message received by the first communication unit 1101 is a network join message from the target apparatus remotely activated in Step S1004 (Yes in Step S1007, the activation time collecting and managing unit 1107 collects the activation time based on the time stored in Step S1004 and the network join message reception time (Step S1008). Next, based on a previously collected activation time of the target apparatus, the activation time collecting and managing unit 1107 determines, as a predicted activation time, the time predicted as being required for future remote activation of the target apparatus (Step S1009).

Furthermore, the activation time collecting and managing unit 1107 adds the predicted activation time to the apparatus information list 1108 (Step S1010) and returns to Step S1001.

Figure 9:
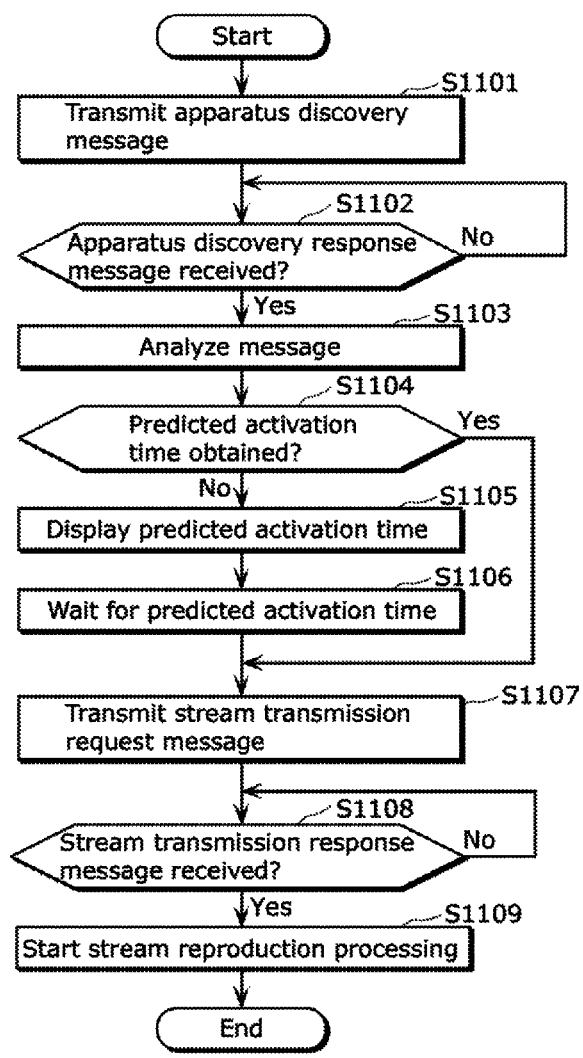
FIG. 9 is a flowchart of processes performed by the client apparatus according to Embodiment 1 of the present invention.

Next, a flow of processes performed by the client apparatus 1004 is described with reference to FIG. 9. FIG. 9 is a flowchart of the processes performed by the client apparatus 1004 according to Embodiment 1 of the present invention. More specifically, FIG. 9 is a flowchart of the processes starting with the process in which the client apparatus 1004 transmits the apparatus discovery message and ending with the process in which the client apparatus 1004 starts reproduction of the stream of the content.

First, the apparatus co-operation processing unit 1201 multicasts, using the communication unit 1204, the apparatus discovery message for discovering the server apparatus in the first network 1001 to the apparatuses on the first network 1001 (Step S1101). Next, the apparatus co-operation processing unit 1201 determines whether or not the message received by the communication unit 1204 is a response message (hereinafter, referred to as an "apparatus discovery response message") that is directed to the apparatus discovery message (Step S1102). Here, when the message received by the communication unit 1204 is not an apparatus discovery response message (No in Step S1102), the process in Step S1102 is repeated until an apparatus discovery response message is received.

When the message received by the communication unit 1204 is an apparatus discovery response message (Yes in Step S1102), the apparatus co-operation processing unit 1201 analyzes the apparatus discovery response message (Step S1103). Next, the apparatus co-operation processing unit 1201 determines whether or not the apparatus discovery response message includes the information indicating the predicted activation time (Step S1104).

Here, when the apparatus discovery response message does not include the information indicating the predicted activation time (No in Step S1104), the stream reproducing unit 1202 determines that the server apparatus 1005 that is the target apparatus indicated by the apparatus discovery response message is in an activated state, and transmits the stream transmission request message to the server apparatus 1005 (Step S1107).

Figure 10:
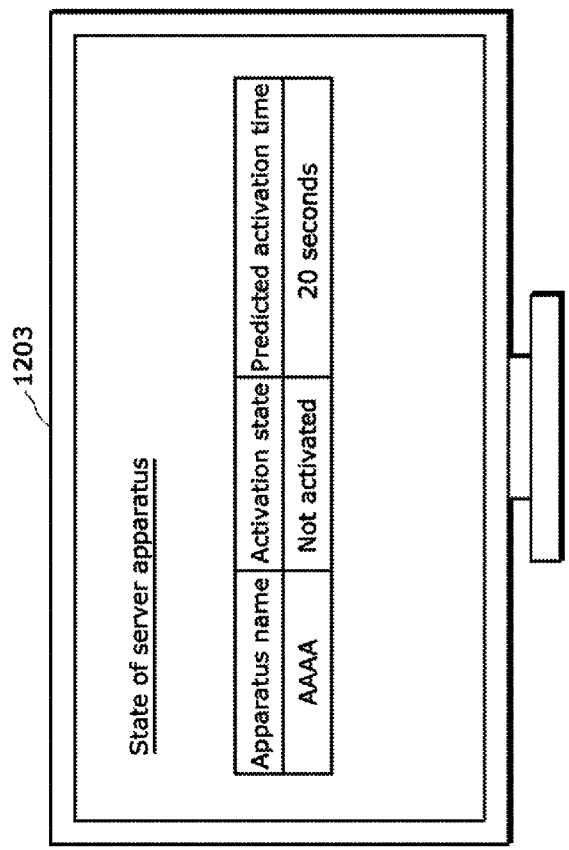
FIG. 10 is a diagram of an example of information displayed by the client apparatus according to Embodiment 1 of the present invention.

When the apparatus discovery response message includes the information indicating the predicted activation time (Yes in Step S1104), the display unit 1203 displays the predicted activation time on the display screen (Step S1105). For example, as shown in FIG. 10, the display unit 1203 displays the predicted activation time on the display screen.

Next, the apparatus co-operation processing unit 1201 waits for the predicted activation time (Step S1106), and then notifies the stream reproducing unit 1202 of the prediction result that the server apparatus 1005 is in an activated state. Next, the stream reproducing unit 1202 transmits the stream transmission request message to the server apparatus 1005 (Step S1107).

Next, the stream reproducing unit 1202 determines whether or not the message received by the communication unit 1204 is a stream transmission response message (Step S1108). Here, when the message received by the communication unit 1204 is not a stream transmission response message (No in Step S1108), the process in Step S1108 is repeated until a stream transmission response message is received. When the message received by the communication unit 1204 is a stream transmission response message (Yes in Step S1108), the stream reproducing unit 1202 starts the stream reproducing process (Step S1109).

Next, a flow of processes performed by the server apparatus 1005 is described with reference to FIG. 11 and FIG. 12.

Figure 11:
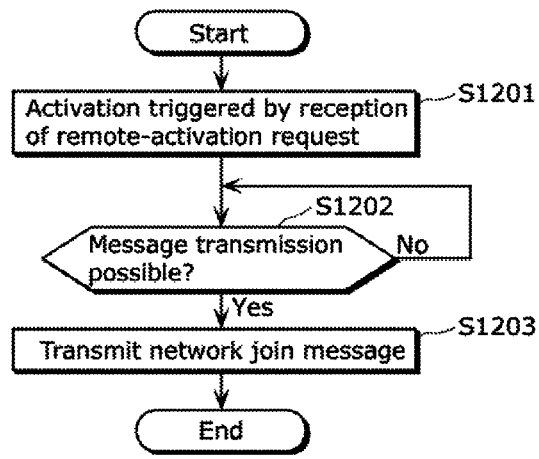
FIG. 11 is a flowchart of activation processes performed by the server apparatus according to Embodiment 1 of the present invention.

FIG. 11 is a flowchart of the activation processes performed by the server apparatus 1005 according to Embodiment 1 of the present invention. More specifically, FIG. 11 is a flowchart of the processes starting with the process in which the server apparatus 1005 receives a remote activation request and ending with the process in which the server apparatus 1005 transmits a network join message.

First, the remote-activation receiving unit 1301 receives the remote activation request from the gateway apparatus 1003 via the second network 1002, and notifies the activating unit 1302 of the successful reception of the remote activation request. Next, the activating unit 1302 activates the whole server apparatus 1005 (Step S1201).

Even when the server apparatus 1005 is in a non-activated state, each of the activating unit 1302, the remote-activation receiving unit 1301, and the second communication unit 1308 receives power supply, and is in a processing executable state.

The apparatus co-operation processing unit 1303 waits until the server apparatus 1005 is changed into an activated state, that is, into a state in which the server apparatus 1005 can transmit a message using the first communication unit 1307 (Step S1202). Next, the apparatus co-operation processing unit 1303 multicasts the network join message when the server apparatus 1005 is changed into the state for transmitting the message (Step S1203).

In this way, the server apparatus 1005 transmits the network join message. This enables the gateway apparatus 1003 to collect the activation time that starts when the remote activation of the server apparatus 1005 is started via the second network 1002 and ends when the server apparatus 1005 is changed into the state for actually establishing communication via the first network 1001.

Figure 12:
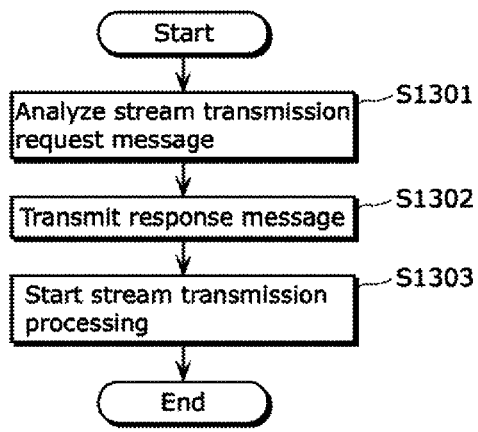
FIG. 12 is a flowchart of stream transmission processes performed by the server apparatus according to Embodiment 1 of the present invention.

FIG. 12 is a flowchart of stream transmitting processes performed by the server apparatus according to Embodiment 1 of the present invention. More specifically, FIG. 12 is a flowchart of the processes starting with the process in which the server apparatus 1005 receives the stream transmission request message from the client apparatus 1004 and ending with the process in which the server apparatus 1005 starts the stream transmitting process.

The stream transmitting unit 1305 analyzes the stream transmission request message received by the first communication unit 1307 (Step S1301). Next, the stream transmitting unit 1305 transmits the stream transmission response message to the transmission source of the stream transmission request message (Step S1302). Next, the stream transmitting unit 1305 transmits the requested content in the form of a stream (Step S1303).

These processes are a sequence of processes in general streaming. For example, the stream transmission request message is a GET request according to HTTP (HyperText Transfer Protocol) including URI (Uniform Resource Identifier) indicating the content. In addition, the server apparatus 1005 transmits the stream which includes a response to the HTTP GET request in the header and includes the content data in the payload.

In this way, with the apparatus co-operation network system according to this embodiment, the gateway apparatus 1003 can store, as a predicted activation time, the time predicted as being required to activate the server apparatus 1005. As a result, even when the server apparatus 1005 is not in an activated state when the client apparatus 1004 reproduces the stream of the content in the server apparatus 1005, the client apparatus 1004 can continue the processing, notifies the user of the predicted activation time for the server apparatus 1005, and thereby prevents the user from becoming anxious.

In other words, with the apparatus co-operation network system according to this embodiment, the gateway apparatus 1003 can remotely activate the target apparatus to which the apparatus discovery message is directed when the target apparatus is not in an activated state, and transmit a response message including the information indicating the activation time predicted as being required for the target apparatus to the client apparatus 1004 in proxy of the target apparatus. Accordingly, the client apparatus 1004 can execute various kinds of processes based on the predicted activation time for the target apparatus, and to thereby stably co-operate with the target apparatus.

More specifically, the client apparatus 1004 can notify the user of the predicted activation time, and suppress an erroneous user operation. In addition, since the client apparatus 1004 can transmit the message to the target apparatus after the elapse of the predicted activation time, and the client apparatus 1004 can stably co-operate with the target apparatus.

[Embodiment 2]

Next, Embodiment 2 of the present invention is described.

In this Embodiment, a case is described in which there is a plurality of target apparatuses that satisfies a requirement described in apparatus discovery message transmitted from a client apparatus 1004.

Figure 13:
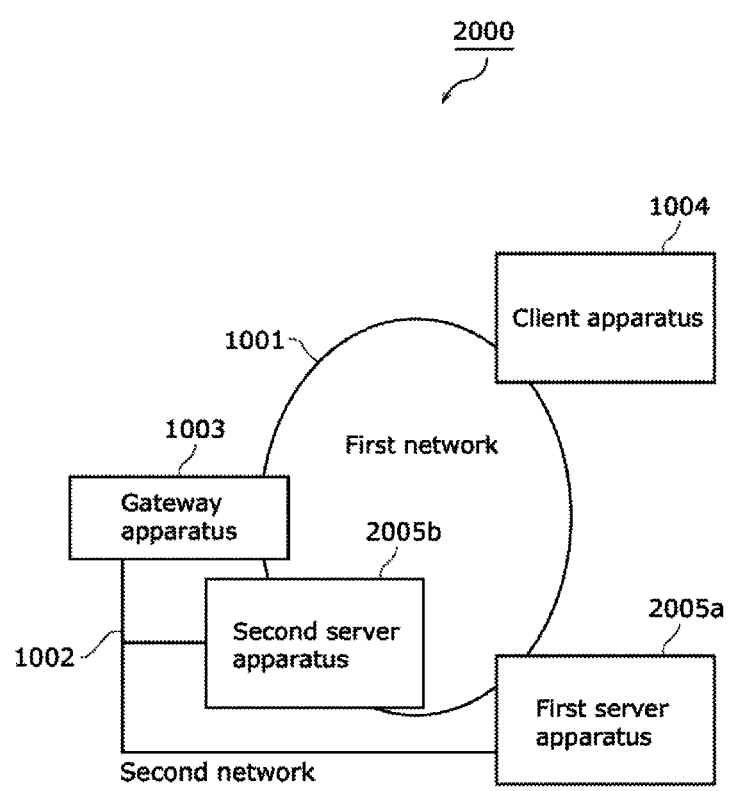
FIG. 13 schematically shows an apparatus co-operation network system according to Embodiment 2 of the present invention.

FIG. 13 schematically shows an apparatus co-operation network system 2000 according to Embodiment 2 of the present invention. In FIG. 13, the same structural elements as in those of FIG. 1 are assigned with the same reference signs and not described here again.

As shown in FIG. 13, the apparatus co-operation network system 2000 includes a first server apparatus 2005a and a second server apparatus 2005b, in proxy of the server apparatus 1005.

A gateway apparatus 1003 and the client apparatus 1004 according to this embodiment are similar in their functions to the equivalents in Embodiment 1. In addition, the first server apparatus 2005a and the second server apparatus 2005b are similar in their functions to the server apparatus 1005 according to Embodiment 1. Accordingly, the same descriptions are not repeated for the functions of the gateway apparatus 1003, the client apparatus 1004, the first server apparatus 2005a, and the second server apparatus 2005b according to this embodiment.

Next, descriptions are given of various kinds of operations performed in the apparatus co-operation network system 2000 configured as described above.

Figure 14:
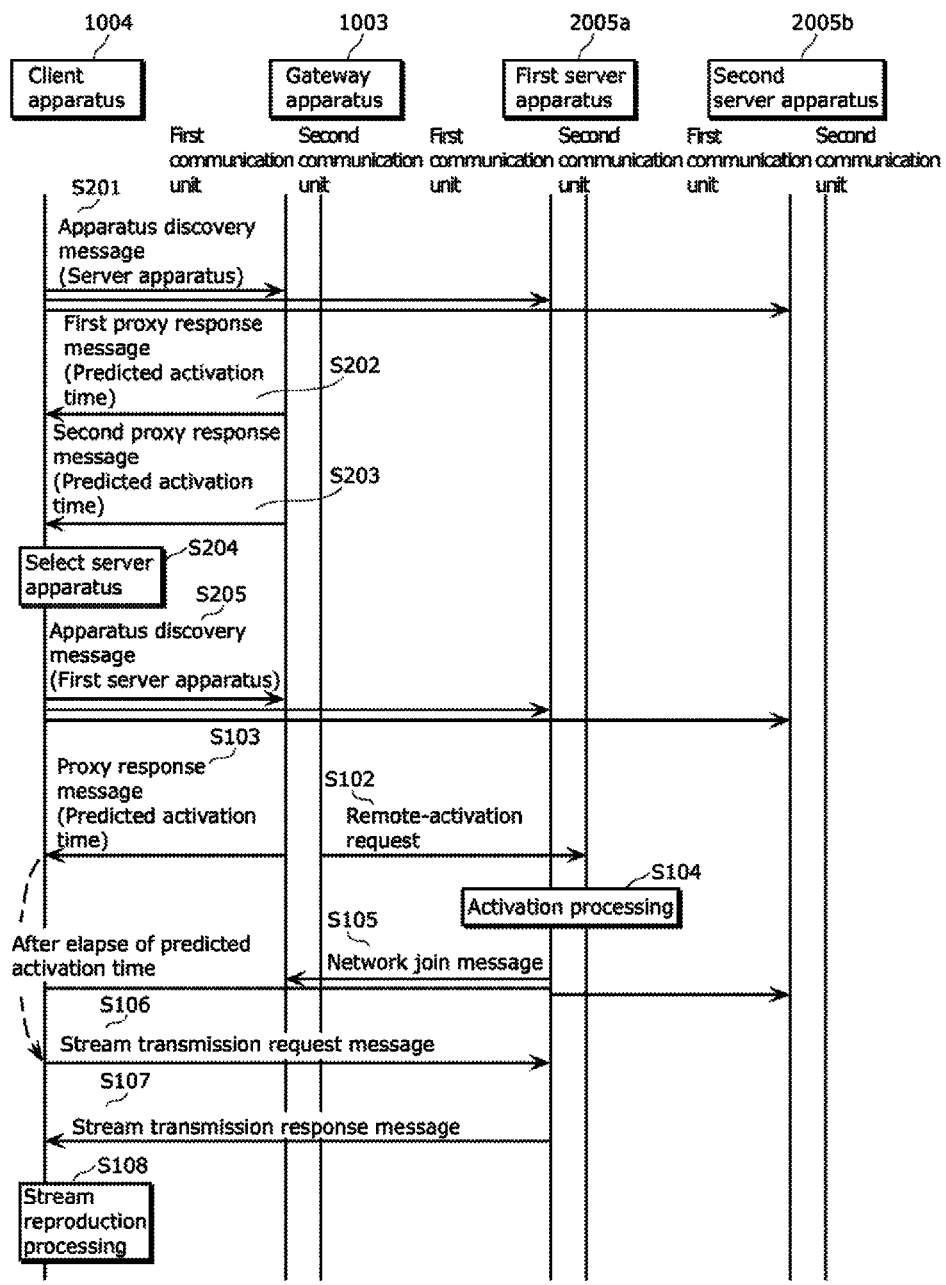
FIG. 14 is a sequence diagram showing an information flow in the apparatus co-operation network system according to Embodiment 2 of the present invention.

FIG. 14 is a sequence diagram showing an information flow in the apparatus co-operation network system 2000 according to Embodiment 2 of the present invention. In FIG. 14, processes similar to those of FIG. 7 are assigned with the same reference signs and not described here again. FIG. 14 illustrates a case where each of the first server apparatus 2005a and the second server 2005b is in a non-activated state as an initial state.

First, the apparatus co-operation processing unit 1201 of the client apparatus 1004 broadcasts the apparatus discovery message for discovering an apparatus that satisfies an arbitrary requirement to the apparatuses (the gateway apparatus 1003, the first server apparatus 2005a, and the second server apparatus 2005b) in the first network 1001 (Step S201). Here, each of the first server apparatus 2005a and the second server apparatus 2005b is in the non-activated state, and thus cannot receive the apparatus discovery message.

Next, the activation state managing unit 1103 of the gateway apparatus 1003 checks whether or not each target apparatus that satisfies the requirement indicated by the apparatus discovery message is in an activated state or not. Here, an activation state managing unit 1103 extracts the first server apparatus 2005a and the second server apparatus 2005b as the target apparatuses. Next, the activation state managing unit 1103 checks whether or not each of the first server apparatus 2005a and the second server apparatus 2005b is in an activated state.

Here, since the plurality of target apparatuses are extracted, a remote-activation control unit 1105 does not transmit any remote activation request to the target apparatuses even when the target apparatuses (the first server apparatus 2005a and the second server apparatus 2005b) are each in a non-activated state. In other words, the remote-activation control unit 1105 remotely activates the target apparatus when the number of target apparatuses is 1, and does not remotely activate the target apparatuses when the number of target apparatuses is 2 or more.

A proxy response unit 1109 of the gateway apparatus 1003 transmits a first proxy response message including information indicating predicted activation time to the client apparatus 1004 that is the transmission source of the apparatus discovery message, in proxy of the first server apparatus 2005a (Step S202).

Furthermore, the proxy response unit 1109 transmits a second proxy response message including information indicating a predicted activation time to the client apparatus 1004, in proxy of the second server apparatus 2005b (Step S203).

Next, the client apparatus 1004 selects a target apparatus from among the plurality of target apparatus indicated by a plurality of response messages (Step S204). Here, for example, according to a user instruction, the client apparatus 1004 selects the first server 2005a.

Next, an apparatus co-operation processing unit 1201 of the client apparatus 1004 broadcasts an apparatus discovery message for discovering the selected target apparatus (the first server apparatus 2005a) (Step S205). In other words, upon receiving the plurality of response messages, the apparatus co-operation processing unit 1201 transmits the apparatus discovery message for discovering the target apparatus selected from among the plurality of target apparatuses indicated by the plurality of response messages to the target apparatuses on the first network 1001.

At this time, only the selected target apparatus (the first server apparatus 2005a) satisfies the requirement indicated by the apparatus discovering message. Hereinafter, processing performed in Steps S102 to S108 are executed as in Embodiment 1.

Next, a flow of processes performed by the gateway apparatus 1003 is explained with reference to FIG. 15.

Figure 15:
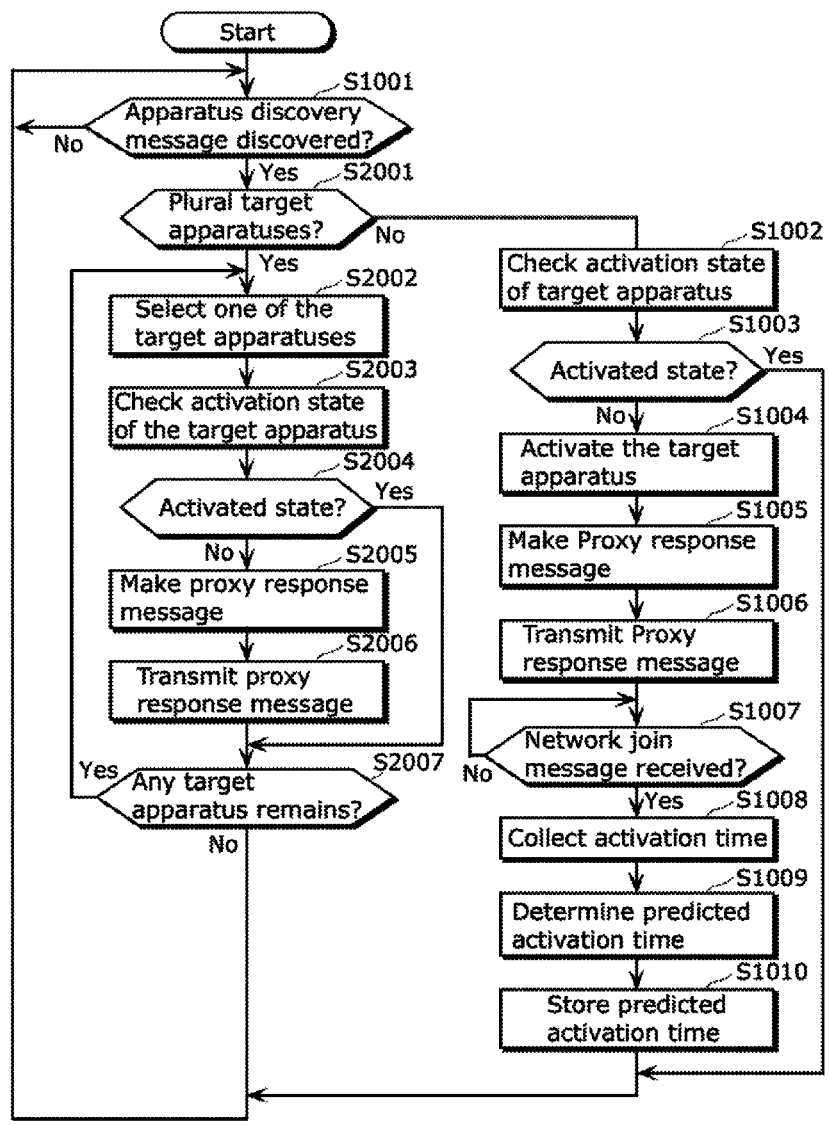
FIG. 15 is a flowchart of processes performed by the gateway apparatus according to Embodiment 2 of the present invention.

FIG. 15 is a flowchart of the processes performed by the gateway apparatus 1003 according to Embodiment 2 of the present invention. More specifically, FIG. 15 is a flowchart of the processes starting with the process in which the gateway apparatus 1003 detects the apparatus discovery message and ending with the process in which the gateway apparatus 1003 adds the predicted activation time to the apparatus information list 1108. In FIG. 15, processes similar to those of FIG. 8 are assigned with the same reference signs and not described here again.

When an apparatus discovery message is discovered (Yes in Step S1001), the activation state managing apparatus 1103 checks whether or not the number of target apparatuses that satisfy the requirement indicated by the apparatus discovery message is 2 or more (Step S2001). Here, when the number of target apparatuses is 1 (No in Step S2001), the processing performed in Steps S1002 to S1009 are executed as in Embodiment 1.

On the other hand, when the number of target apparatuses is 2 or more (Yes in Step S2001), one target apparatus is selected from among the plurality of apparatuses (S2002). Next, the activation state managing unit 1103 checks the activation state of the selected target apparatus (Step S2003). Here, when the selected target apparatus is in an activated state (Yes in Step S2004), Step S2007 is executed.

When the target apparatus is not in an activated state (No in Step S2004), the proxy response unit 1109 makes a proxy message (Step S2005). Next, the proxy response unit 1109 transmits, using the first communication unit 1101, the made proxy response message to the apparatus that is the transmission source of the apparatus discovery message (Step S2006).

The proxy response unit 1109 checks whether or not there remains any target apparatus that is not yet selected, with reference to an apparatus information list 1108 (Step S2007). When there remains any unselected target apparatus (Yes in Step S2007), a return is made to Step S2002. When there is no unselected target apparatus (No in Step S2007), a return is made to Step S1001.

In this way, when the number of target apparatuses is 2 or more, the gateway apparatus 1003 transmits the proxy response message for the client apparatus 1004, but does not actually perform any remote activation. For this reason, the target apparatus is not remotely activated wastefully, until the user of the client apparatus 1004 selects the target apparatus from among the target apparatuses. Therefore, it is possible to suppress increase in the power consumption.

Next, a flow of processes performed by the client apparatus 1004 is described with reference to FIG. 16.

Figure 16:
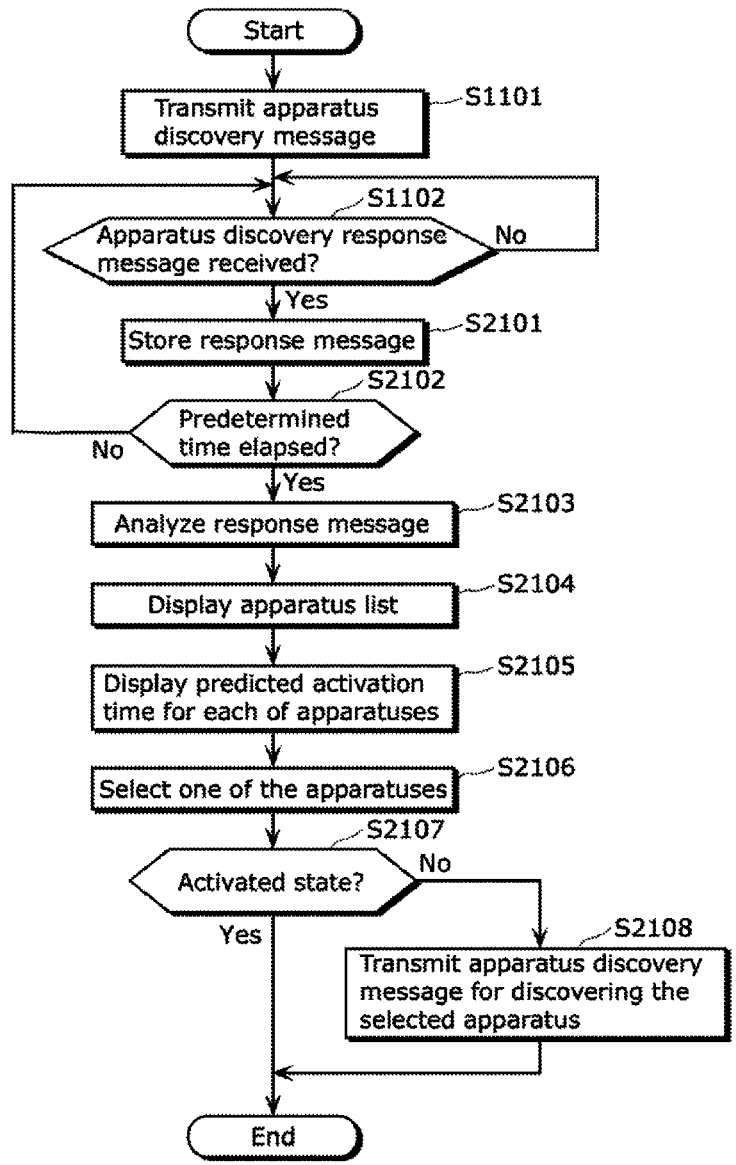
FIG. 16 is a flowchart of processes performed by the client apparatus according to Embodiment 2 of the present invention.

FIG. 16 is a flowchart of the processes performed by the client apparatus 1004 according to Embodiment 2 of the present invention. More specifically, FIG. 16 is a flowchart of the processes performed when the client apparatus 1004 receives a plurality of response messages. In FIG. 16, processes similar to those of FIG. 9 are assigned with the same reference signs and not described here again.

Upon receiving a response message (Yes in Step S1102), the apparatus co-operation processing unit 1201 stores the response message in a memory (Step S2101). The apparatus co-operation processing 1201 determines whether or not a predetermined time (such as 10 seconds) is already elapsed after the apparatus discovery message is transmitted (Step S2102).

When the predetermined time is not yet elapsed (No in Step S2102), a return is made to Step S1102. When the predetermined time is already elapsed (Yes in Step S2102), the apparatus co-operation processing unit 1201 analyzes all the response messages stored in the memory (Step S2103).

Next, the display unit 1203 displays GUI (Graphical User Interface) for enabling the user to select the target apparatus from among the target apparatuses indicated by the analyzed response messages (Step S2104). Furthermore, when a predicted activation time is obtained from the analyzed response messages, the display unit 1203 displays the obtained predicted activation time for each target apparatus in association with the target apparatus (Step S2105). More specifically, the display unit 1203 displays a GUI, for example, as shown in FIG. 17A or FIG. 17B.

Figure 17A:
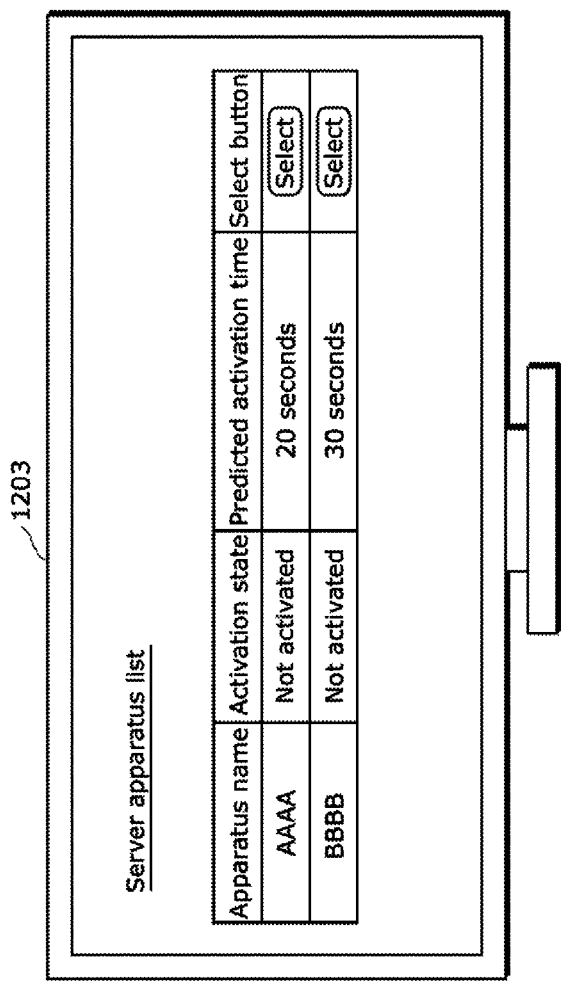
FIG. 17A is a diagram of an example of information displayed by the client apparatus according to Embodiment 2 of the present invention.

Each of FIG. 17A and FIG. 17B is a diagram of an example of information displayed by the client apparatus according to Embodiment 2 of the present invention. For example, as shown in FIG. 17A, the client apparatus 1004 displays, for each target apparatus, the apparatus name, the activation state, the predicted activation time, and the selection button.

In addition, the client apparatus 1004 may display the power consumption of each target apparatus as shown in FIG. 17B. In this case, it is only necessary to include such power consumption in each response message. In this way, with the display of such power consumption, it is possible to select the target apparatus having a low power consumption from among the target apparatuses, and to thereby saving energy.

The client apparatus 1004 receives, from the user, an instruction for selecting the apparatus from among the displayed apparatuses (Step S2106). Next, the apparatus co-operation processing unit 1201 determines whether or not the selected target apparatus is in an activated state, based on presence or absence of the information indicating the predicted activation time in the response message (Step S2107).

Here, when the selected target apparatus is not in an activated state (No in Step S2107), the apparatus co-operation processing unit 1201 broadcasts the apparatus discovery message for discovering the selected target apparatus to the apparatuses on the first network 1001 (Step S2108). When the selected target apparatus is in an activated state (Yes in Step S2107), the process is completed, and a transition is made to a stream reproducing process.

In Step S1508, triggered by the transmission of the apparatus discovery message for identifying the selected target apparatus, the gateway apparatus 1003 performs an operation similar to an operation performed in Embodiment 1. In other words, the target apparatus that satisfies the requirement indicated by the apparatus discovery message is remotely activated. Furthermore, until the activation of the target apparatus is completed, the client apparatus 1004 can display, on the display screen, a waiting time based on the predicted activation time indicted by the information included in the proxy response message.

In this way, with the apparatus co-operation network system 2000 according to this embodiment, it is possible to suppress power consumed when the target apparatus is activated wastefully even when there is a plurality of target apparatuses that satisfy the requirement indicated by the apparatus discovery message. Furthermore, it is possible to notify the user of the predicted activation time, and continue the apparatus co-operation processing.

In other words, with the apparatus co-operation network system 2000 according to this embodiment, there is no need to remotely activate all the target apparatuses in non-activated states, and thus it is possible to suppress increase in the power consumption.

The apparatus co-operation network system according to an aspect of the present invention has been described above based on the embodiments, but the present invention is not limited to these embodiments. Those skilled in the art will readily appreciate that many modifications are possible in the exemplary embodiments and other embodiments are possible by arbitrarily combining the structural elements of the embodiments without materially departing from the novel teachings and advantageous effects of the present invention. Accordingly, all of the modifications and other embodiments are intended to be included within the scope of this invention.

In Embodiments 1 and 2, the proxy response message transmitted by a proxy apparatus in proxy of a target apparatus includes information indicating a predicted activation time. However, for example, the proxy response message may further include information indicating a prediction accuracy of the predicted activation time. In this case, it is only necessary for the activation time collecting and managing unit 1107 to calculate the prediction accuracy based on the number of times of collecting an activation time of activating the target apparatus (this number is hereinafter referred to as "the number of collections"). More specifically, the activation time collecting and managing unit 1107 may calculate the prediction accuracy, for example, such that the prediction accuracy increases with an increase in the number of collections. In addition, for example, the activation time collecting and managing unit 1107 may calculate the prediction accuracy by using a variance of the collected activation times. When a prediction accuracy is calculated based on the number of collections, the apparatus information list 1108 further includes the number of collections as shown in FIG. 18.

In this way, with the information indicating the prediction accuracy is included in the response message, the client apparatus 1004 can execute various kinds of processes based on the prediction accuracy, and to thereby stably co-operate with the target apparatus. More specifically, in the case of a low prediction accuracy, the client apparatus 1004 may further delay the timing for transmitting a message to the server apparatus 1005 after the predicted activation time is elapsed. In addition, the client apparatus 1004 may display the prediction accuracy on the display screen.

In addition, in Embodiments 1 and 2, the network join message transmitted from the remotely-activated target apparatus may include information indicating whether or not the target apparatus is remotely activated by the gateway apparatus 1003. In this way, the activation time collecting and managing unit 1107 is required to collect the activation time of the target apparatus only when the network join message indicates the successful remote activation of the target apparatus.

With this structure, the gateway apparatus 1003 can collect an activation time only when the network join message indicates the successful remote activation. In other words, the gateway apparatus 1003 can prevent collection of an activation time, based on the network join message that is transmitted in the case of activation by an activation process other than remote activation. As a result, it is possible to collect an accurate activation time in the case of the remote activation by the gateway apparatus 1001

In addition, the client apparatus 1004 displays the predicted activation time on the display screen in Embodiments 1 and 2, but the predicted activation time may not be displayed. For example, the client apparatus 1004 may include a voice output unit that outputs a voice message indicating a predicted activation time. In other words, the client apparatus 1004 may include a notifying unit that notifies the user of the predicted activation time.

In addition, in Embodiments 1 and 2, the predicted activation time is predicted when the activation time is collected. However, the timing for the prediction may not be other timing. For example, it is possible to predict a predicted activation time immediately before transmitting the proxy response message. In this case, the apparatus information list 1108 may store the raw collected activation time, instead of the predicted activation time.

In addition, in Embodiments 1 and 2, the processes for discovering the server apparatus that transmits a stream. However, the present invention is not limited to the processes. For example, the present invention may be applied to processes for discovering a client apparatus.

In addition, in Embodiments 1 and 2, as shown in FIG. 10, FIG. 17A, or FIG. 17B, the display unit 1203 displays the raw predicted activation time. However, the predicted activation time may be displayed in other forms. For example, the display unit 1203 may display the predicted activation time in the form of a symbol that is "Long", "Medium", or "Short".

In addition, in Embodiments 1 and 2, the activation time collecting and managing unit 1107 collects the activation time of the target apparatus using the activation starting time of the target apparatus and the network join message reception time of the target apparatus. However, the activation time collecting and managing unit 1107 may collect the activation time of the target apparatus based on the power consumption value of the target apparatus. More specifically, the activation time collecting and managing unit 1107 may collect the activation time of the target apparatus, for example, based on the result of comparing history of the power consumption values of the target apparatus with each of predetermined patterns.

In this case, the gateway apparatus 1003 may include a power consumption measuring unit that measures the power consumption values of the target apparatus. In addition, the gateway apparatus 1003 may obtain power consumption values of the target apparatus from a power consumption measuring device. This power consumption measuring unit or the power consumption measuring device may measure the power consumption values by, for example, measuring the current values at electric outlets or distribution switchboards provided in a building in which the gateway apparatus 1003 is provided. At this time, the current value may be measured, for example, for each electric outlet, each breaker, or the whole building.

Figure 19:
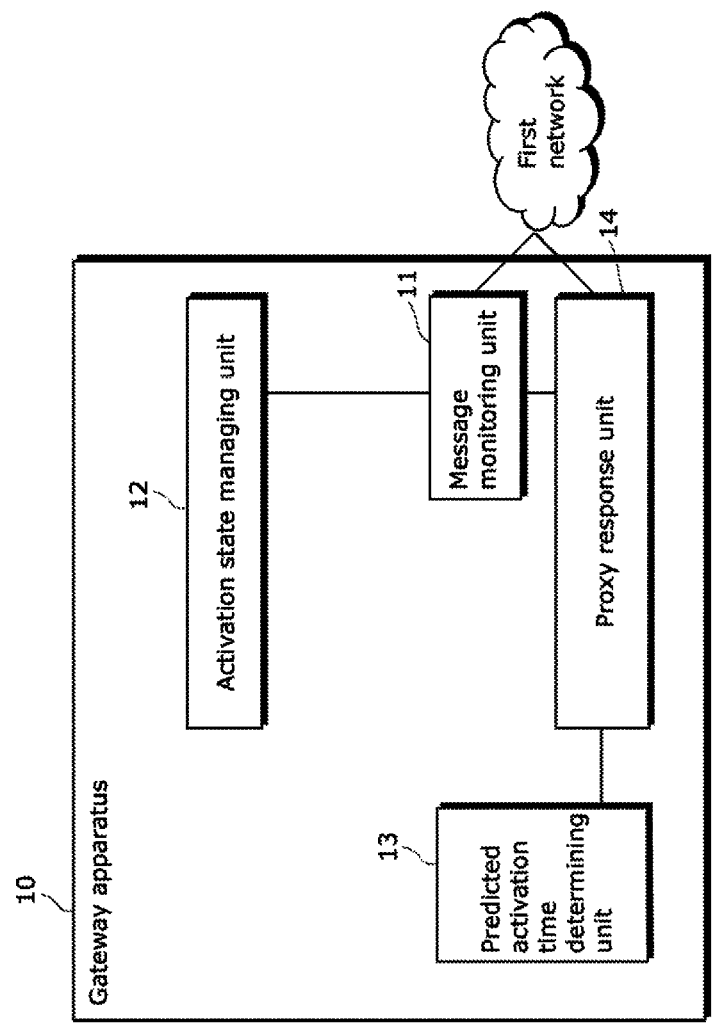
FIG. 19 is a block diagram of a functional structure of a gateway apparatus according to an aspect of the present invention.

In addition, in Embodiments 1 and 2, the gateway apparatus 1003 includes the structural elements shown in FIG. 2, but the gateway apparatus 1003 does not always need to include all the structural elements. For example, the gateway apparatus may be the gateway apparatus 10 as shown in FIG. 19. In other words, the gateway apparatus 10 may be for allowing a plurality of apparatuses on a first network to co-operate with each other, and may include: a message monitoring unit 11 configured to monitor messages communicated on the first network, and detect an apparatus discovery message for discovering an apparatus that satisfies an arbitrary requirement; an activation state managing unit 12 configured to check whether at least one target apparatus among the apparatuses that satisfies the requirement indicated by the apparatus discovery message is in an activated state for communication on the first network; a predicted activation time determining unit 13 configured to determine a predicted activation time that is a time predicted as required to activate the at least one target apparatus; and a proxy response unit 14 configured to transmit, in proxy of the at least one target apparatus, a response message including information indicating the predicted activation time when the at least one target apparatus is not in an activated state.

In addition, in Embodiments 1 and 2, the gateway apparatus 1004 includes the structural elements shown in FIG. 5, but the gateway apparatus 1004 does not always need to include all the structural elements. For example, the client apparatus 1004 may be a communication apparatus which co-operate with apparatuses on a first network, may include an apparatus co-operation processing unit configured to transmit, to the apparatuses on the first network, an apparatus discovery message for discovering an apparatus that satisfies an arbitrary requirement, and receives response messages to the apparatus discovery message, and may execute a predetermined process, based on the predicted activation time when the response message includes the predicted activation time that is time predicted as required to activate the at least one target apparatus that satisfies the requirement indicated by the apparatus discovery message.

In addition, a part or all of the structural elements of the gateway apparatus 1003, the client apparatus 1004, or the server apparatus 1005 according to any of Embodiment 1 and Embodiment 2 may be configured with a single system LSI (Large Scale Integration) circuit. For example, the gateway apparatus 1003 may be configured with a system LSI including a message monitoring unit, an activation state managing unit, a predicted activation time determining unit, and a proxy response unit.

The system LSI is a super-multi-function LSI manufactured by integrating constituent units on a single chip, and is specifically a computer system configured to include a microprocessor, a ROM (Read Only Memory) and a RAM (Random Access Memory), and so on. The ROM includes a computer program recorded therein. The system LSI achieves its function through the microprocessor's operations according to the computer program.

The name used here is system LSI, but it may also be called IC, system LSI, super LSI, or ultra LSI depending on the degree of integration. Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Furthermore, if integrated circuit technology that replaces LSI appears thorough progress in semiconductor technology or other derived technology, that technology can naturally be used to carry out integration of the constituent elements. Biotechnology is anticipated to apply.

Furthermore, the present invention can be realized not only as the gateway apparatus including the above-described unique processing units, but also as an apparatus co-operation method including the steps corresponding to the unique processing units of the gateway apparatus. In addition, the present invention can be realized as a computer program for causing a computer to execute the unique steps of the apparatus co-operation method. Such a computer program can naturally be distributed via non-transitory computer-readable recording media such as CD-ROMs and communication networks such as the Internet.

INDUSTRIAL APPLICABILITY

An apparatus co-operation network system according to the present invention is applicable as, for example, an AV system for allowing AV apparatuses on a home network to co-operate with each other.

REFERENCE SIGNS LIST

10 Gateway apparatus
11, 1106 Message monitoring unit
12, 1103 Activation state managing unit
13 Predicted activation time determining unit
14, 1109 Proxy response unit
1105 Remote-activation control unit
1000, 2000 Apparatus network system
1001 First network
1002 Second network
1003 Gateway apparatus
1004 Client apparatus
1005 Server apparatus
1101, 1307 First communication unit
1102, 1308 Second communication unit
1104 Activation state list 1107 Activation time collecting and managing unit
1108 Apparatus information list
1110, 1309 Memory unit
1201, 1303 Apparatus co-operation processing unit
1202 Stream reproducing unit
1203 Display unit
1204 Communication unit
1301 Remote-activation receiving unit
1302 Activating unit
1304 Apparatus information
1305 Stream transmitting unit
1306 Contents
2005a First server apparatus
2005b Second server apparatus

The invention claimed is:

1. A gateway apparatus for allowing a plurality of apparatuses on a first network to co-operate with each other, the gateway apparatus comprising:
a message monitoring unit configured to monitor messages communicated on the first network, and detect an apparatus discovery message for discovering an apparatus that satisfies an arbitrary requirement;
an activation state managing unit configured to check whether at least one target apparatus included in the apparatuses and satisfying the requirement indicated by the apparatus discovery message is in an activated state for communication on the first network;
a predicted activation time determining unit configured to monitor the messages communicated on the first network, and determine a predicted activation time that is a time predicted as required to activate the at least one target apparatus; and
a proxy response unit configured to transmit, in proxy of the at least one target apparatus, a response message including information indicating the predicted activation time, when the at least one target apparatus is not in an activated state.

2. The gateway apparatus according to claim 1, further comprising
an activation time collecting unit configured to collect an activation time of the at least one target apparatus, based on a time at which activation of the at least one target apparatus is started and a reception time of a network join message indicating that the at least one target apparatus is already in the activated state for communication on the first network,
wherein the predicted activation time determining unit is configured to determine the predicted activation time, based on a previously collected activation time of the at least one target apparatus.

3. The gateway apparatus according to claim 2,
wherein the predicted activation time determining unit is further configured to calculate a prediction accuracy of the predicted activation time, based on the number of times of collecting an activation time of the at least one target apparatus, and
the response message further includes information indicating the prediction accuracy.

4. The gateway apparatus according to claim 2, further comprising
a remote-activation control unit configured to remotely activate the at least one target apparatus via a second network, when the response message is transmitted,
wherein the activation time collecting unit is configured to collect the activation time of the at least one target apparatus, regarding a time at which remote activation of the at least one target apparatus is started as the time at which the activation of the at least one target apparatus is started.

5. The gateway apparatus according to claim 4,
wherein the network join message includes information indicating whether the at least one target apparatus is already remotely activated by the gateway apparatus or not, and
the activation time collecting unit is configured to collect the activation time of the at least one target apparatus only when the network join message indicates that the at least one target apparatus is already remotely activated by the gateway apparatus.

6. The gateway apparatus according to claim 4,
wherein the remote-activation control unit is configured to remotely activate the at least one target apparatus when the at least one target apparatus is one in number, and avoid remotely activating the at least one target apparatus when the at least one target apparatus is two or more in number.

7. The gateway apparatus according to claim 1, further comprising
an activation time collecting unit configured to collect an activation time of the at least one target apparatus, based on a power consumption value of the at least one target apparatus,
wherein the predicted activation time determining unit is configured to determine the predicted activation time, based on a previously collected activation time of the at least one target apparatus.

8. The gateway apparatus according to claim 1,
wherein the gateway apparatus is configured as an integrated circuit.

9. An apparatus co-operation network system comprising:
a communication apparatus which co-operates with a plurality of apparatuses on a first network; and
a gateway apparatus for allowing some of the plurality of apparatuses on the first network to co-operate with each other,
wherein the communication apparatus includes
an apparatus co-operation processing unit configured to transmit, to the apparatuses on the first network, an apparatus discovery message for discovering an apparatus that satisfies an arbitrary requirement, and receive a response message to the apparatus discovery message, and
the gateway apparatus includes:
a message monitoring unit configured to monitor messages communicated on the first network, and detect an apparatus discovery message for discovering an apparatus that satisfies an arbitrary requirement;
an activation state managing unit configured to check whether at least one target apparatus included in the apparatuses and satisfying the requirement indicated by the apparatus discovery message is in an activated state for communication on the first network;
a predicted activation time determining unit configured to monitor the messages communicated on the first network, and determine a predicted activation time that is a time predicted as required to activate the at least one target apparatus; and
a proxy response unit configured to transmit, in proxy of the at least one target apparatus, a response message including information indicating the predicted activation time, when the at least one target apparatus is not in an activated state.

10. An apparatus co-operation method for allowing a plurality of apparatuses on a first network to co-operate with each other, the apparatus co-operation method comprising:
- monitoring messages communicated on the first network, and detecting an apparatus discovery message for discovering an apparatus that satisfies an arbitrary requirement;
- checking whether at least one target apparatus included in the apparatuses and satisfying the requirement indicated by the apparatus discovery message is in an activated state for communication on the first network;
- monitoring the messages communicated on the first network, and determining a predicted activation time that is a time predicted as required to activate the at least one target apparatus; and
- transmitting, in proxy of the at least one target apparatus, a response message including information indicating the predicted activation time, when the at least one target apparatus is not in an activated state.

11. A non-transitory computer-readable recording medium having recorded thereon a program for causing a computer to execute the apparatus co-operation method according to claim 10.

* * * * *